United States Patent [19]

Okudaira et al.

[11] Patent Number: 4,490,017

[45] Date of Patent: Dec. 25, 1984

[54] HIGH-SPEED ZOOM LENS

[75] Inventors: Sadao Okudaira; Shigetada Sato, both of Tokyo, Japan

[73] Assignee: Asahi Kogaku Kogyo Kabushiki Kaisha, Tokyo, Japan

[21] Appl. No.: 418,970

[22] Filed: Sep. 16, 1982

[30] Foreign Application Priority Data

Dec. 22, 1981 [JP] Japan ................... 56-208727

[51] Int. Cl.³ .................. G02B 9/64; G02B 15/18
[52] U.S. Cl. ........................................... 350/427
[58] Field of Search ....................................... 350/427

[56] References Cited

U.S. PATENT DOCUMENTS 3,885,862  5/1975  Fujioka et al. ............... 350/427

FOREIGN PATENT DOCUMENTS

2650551 12/1977 Fed. Rep. of Germany ...... 350/427

Primary Examiner—John K. Corbin
Assistant Examiner—Rebecca D. Gass
Attorney, Agent, or Firm—Sughrue, Mion, Zinn, Macpeak and Seas

[57] ABSTRACT

A zoom lens comprising a first lens component having a positive refractive power, a second lens component having a negative refractive power, a third lens component having a negative refractive power, and a fourth lens component having a positive refractive power, the first through fourth lens components being arranged in order from an object. The first lens component comprises a focusing lens component composed of a composite lens having a first negative lens and a second positive lens, and a third positive-meniscus lens, the second lens component comprises a variator lens composed of fourth and fifth negative lenses and a sixth positive lens mainly for varying magnification, the third lens component comprises a compensator lens component composed of a seventh negative lens mainly for compensating for a variation of a focal point due to varied magnification, and the fourth lens component comprises a fixed master lens component composed of four or more positive lenses and two negative lenses with positive lenses disposed most closely to the object and an image, respectively.

4 Claims, 12 Drawing Figures

HIGH-SPEED ZOOM LENS

BACKGROUND OF THE INVENTION

The present invention relates to a high-speed zoom lens primarily for use in ⅔-inch and ⅜-inch video cameras.

Recent development of image pickup tubes for video cameras and solid-state image pickup devices has rendered easily feasible those home video cameras which are relatively lightweight, compact and of high performance. As the video cameras have been advanced, there has been a demand for video camera lenses which are lightweight, compact and of high performance. The image pickup tubes and solid-state image pickup devices that are available today have greatly improved image contrasts and color characteristics. However, their sensitivities are still insufficient for taking pictures at a low degree of illumination. Therefore, there is a need for a sufficiently bright lens which is lightweight and compact to meet the requirement of taking pictures under low illumination.

SUMMARY OF THE INVENTION

It is an object of the present invention to provide a high-speed, compact and high-performance video camera zoom lens which meets the foregoing requirement.

DESCRIPTION OF THE PREFERRED EMBODIMENTS

The present invention will now be described in detail.

According to the present invention, there is provided a zoom lens comprising a first lens component having a positive refractive power, a second lens component having a negative refractive power, a third lens component having a negative refractive power, and a fourth lens component having a positive refractive power, the first through fourth lens components being arranged in order from an object, characterized in that the first lens component comprises a focusing lens component composed of a composite lens having a first negative lens and a second positive lens, and a third positive-meniscus lens, the second lens component comprises a variator lens composed of fourth and fifth negative lenses and a sixth positive lens mainly for varying magnification, the third lens component comprises a compensator lens component composed of a seventh negative lens mainly for compensating for a variation of a focal point due to varied magnification, and the fourth lens component comprises a fixed master lens component composed of four or more positive lenses and two negative lenses with positive lenses disposed most closely to the object and an image, respectively, the bright zoom lens satisfying the following requirements:

$$5.5\, F_T > F_F > 4.8\, F_T \quad (1)$$

$$1.6\, F_T > |F_V| > 1.2\, F_T \quad (2)$$

$$1.4\, F_M > \frac{|F_{NA} + F_{NB}|}{2} > 0.7\, F_M \quad (3)$$

$$\frac{N_A + N_B}{2} > 1.78 \quad (4)$$

$$\nu_C > 50 \quad (5)$$

where
- $F_T$: the focal length of the overall lens system when the focal length is minimum;
- $F_F$: the focal length of the first lens group or focusing lens component;
- $F_V$: the focal length of the second lens component or variator lens component;
- $F_M$: the focal length of the fourth lens component or master lens component;
- $F_{NA}, F_{NB}$: the focal lengths of the two negative lenses in the fourth lens component;
- $N_A, N_B$: the refractive indices at the d-line of the two negative lenses in the fourth lens component;
- $\nu_C$: the Abbe number of the third lens component or compensator lens component.

The above requirements will now be described.

The requirement (1) is concerned with the focal length of the first lens component or focusing lens component. If the focal length $F_F$ were smaller than $4.8\, F_T$, then various aberrations caused by the first lens component would become increased, and chromatic and spherical aberrations in the vicinity of the maximum focal length would be difficult to compensate for in order to keep a zoom ratio close to that of the zoom lens according to the embodiment of the present invention. If $F_F$ were greater than $5.5\, F_T$, then the diameter of the front lens would be increased in order to maintain the minimum object distance due to focusing by the first lens component, an arrangement which would prevent a zoom lens from being small in size and lightweight.

The requirement (2) is directed to the focal length of the second lens component or variator lens component which serves mainly to vary magnification. If $|F_V|$ were smaller than $1.2\, F_T$, then variations in the chromatic and spherical aberrations due to zooming would be increased, and the overall system would be difficult to retain its high performance. If $|F_V|$ were larger than $1.6\, F_T$, then an attempt to keep a predetermined zoom range would increase the amount of movement of the second lens component resulting from zooming, rendering the overall lens system larger in size.

The requirement (3) relates to the mean value of the focal lengths of the two negative lenses in the fourth lens component or master lens component. If $$\left| \frac{F_{NA} + F_{NB}}{2} \right|$$

were smaller than $0.7\, F_M$, then the radius of curvature of any of the negative lenses on the image side would be reduced as long as existing kinds of glass are concerned, resulting in poorer coma. If $$\left|\frac{F_{NA} + F_{NB}}{2}\right|$$

were greater than 1.4 $F_M$, then it would be difficult to maintain a back focus required for video camera lenses.

The requirement (4) is related to the requirement (3). If the mean value $(N_A+N_B)/2$ of the refractive indices of the two negative lenses in the fourth lens component, then the radius of curvature of any of the negative lenses on the image side would be reduced even if the requirement (3) could be met, and the coma would be rendered worse.

The requirement (5) deals with the Abbe number of the negative lens of the third lens component or compensator lens group. If $\nu_C$ were smaller than 50, then it would be difficult to construct the third lens component of a single lens if an attempt were made to compensate sufficiently for the chromatic aberration caused in this lens by zooming. Constructing the third lens component of a composite lens or a plurality of lenses would render the lens system larger in size and more costly.

Examples of the present invention will be described hereinbelow. Designated in these examples at r is the radius of curvature of a lens, d the thickness of a lens or the distance between lenses, N the refractive index of a lens the d-line, and $\nu$ the Abbe number of a lens.

EXAMPLE 1

Aperture Ratio = 1:1.4 ~ 1:1.6
Focal Length = 12.9 ~ 73

| | r | d | N | $\nu$ |
|---|---|---|---|---|
| 1 | 139.993 | 2.00 | 1.80518 | 25.4 |
| 2 | 52.754 | 7.50 | 1.62041 | 60.3 |
| 3 | −312.400 | 0.10 | | |
| 4 | 47.092 | 5.73 | 1.71300 | 53.8 |
| 5 | 163.954 | 1.96 | | |
| 6 | 320.000 | 1.20 | 1.69680 | 55.5 |
| 7 | 17.239 | 4.48 | | |
| 8 | −52.200 | 1.20 | 1.73400 | 51.5 |
| 9 | 25.200 | 1.82 | | |
| 10 | 27.500 | 2.80 | 1.84666 | 23.9 |
| 11 | 270.359 | 32.92 | | |
| 12 | −30.207 | 1.20 | 1.48749 | 70.1 |
| 13 | −1381.595 | 8.09 | | |
| 14 | 85.349 | 4.19 | 1.62041 | 60.3 |
| 15 | −43.450 | 0.10 | | |
| 16 | 44.030 | 3.59 | 1.73400 | 51.5 |
| 17 | −684.351 | 0.10 | | |
| 18 | 24.854 | 2.80 | 1.77250 | 49.7 |
| 19 | 60.000 | 3.31 | | |
| 20 | −65.500 | 1.20 | 1.84666 | 23.9 |
| 21 | 41.418 | 2.54 | | |
| 22 | 23.270 | 5.18 | 1.55963 | 61.2 |
| 23 | −96.560 | 1.30 | | |
| 24 | 20.983 | 1.50 | 1.84666 | 23.9 |
| 25 | 11.525 | 6.19 | | |
| 26 | 472.000 | 1.49 | 1.68893 | 31.1 |
| 27 | −106.300 | 1.25 | | |
| 28 | 19.696 | 2.18 | 1.58144 | 40.8 |
| 29 | 74.200 | | | |

Figure 1:
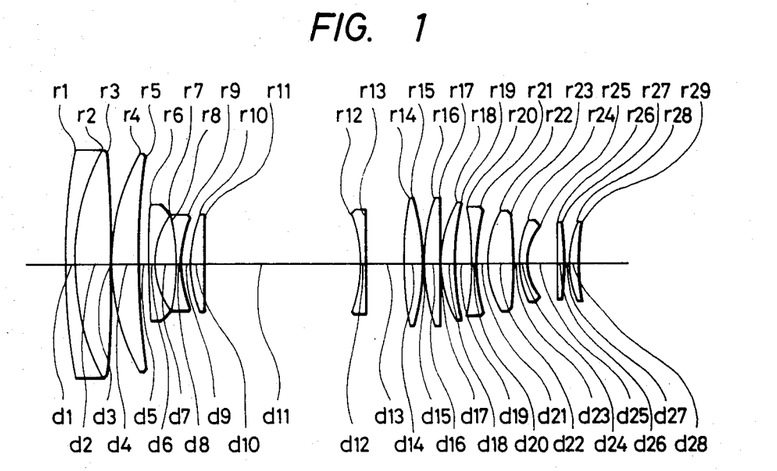
FIG. 1 is a schematic diagram of a lens according to Example 1 of the present invention.
Figure 2:
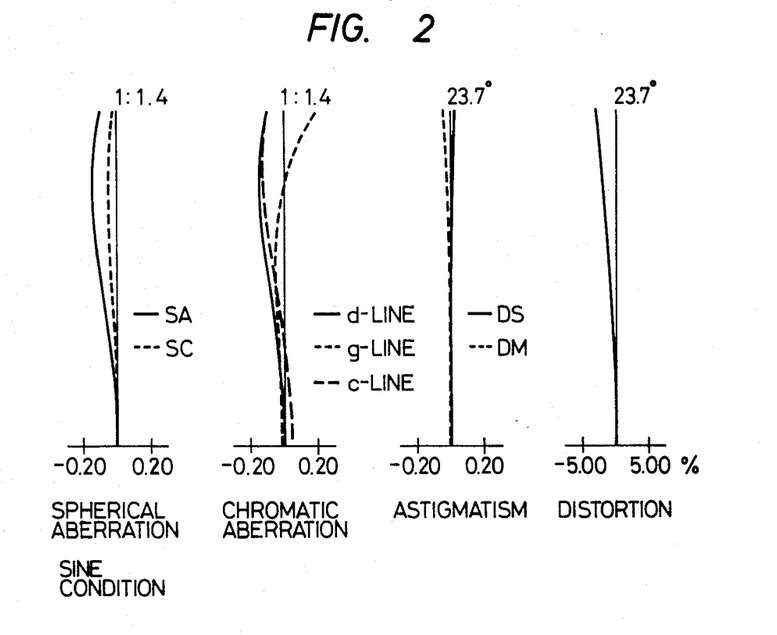
FIGS. 2, 3, 4 are diagrams illustrative of aberrations of the lens according to Example 1 at minimum, medium and maximum focal lengths, respectively.
Figure 3:
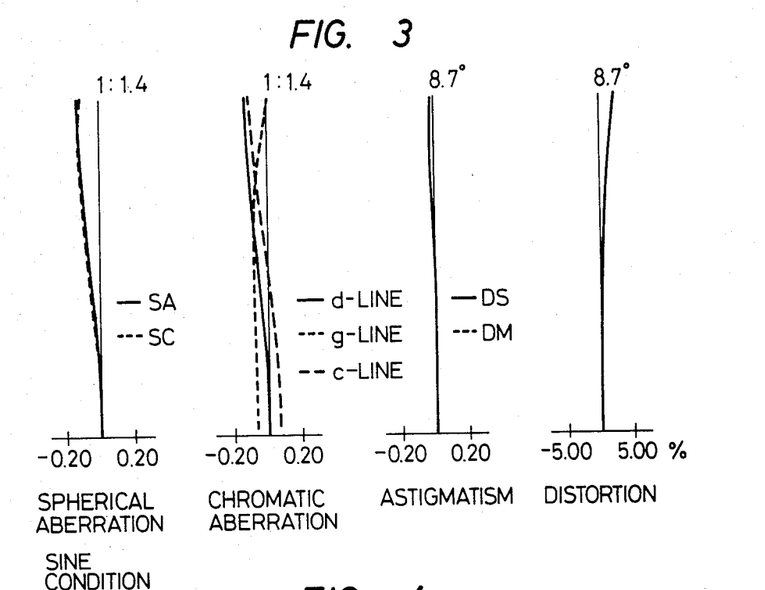
Figure 4:
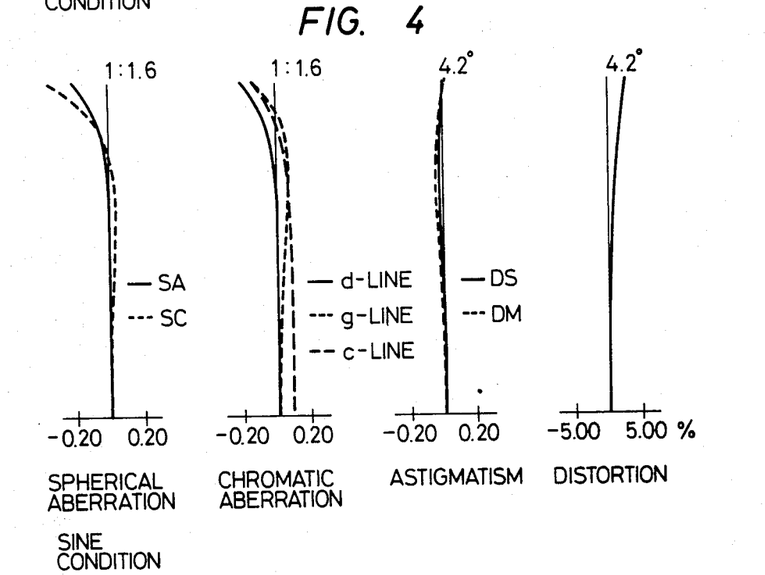

$F_F = 5.13\ F_T$
$|F_V| = 1.49\ F_T$ $$\left|\frac{F_{NA} + F_{NB}}{2}\right| = 1.28\ F_M$$

$$\frac{N_A + N_B}{2} = 1.84666$$

-continued

| | r | d | N | $\nu$ |
|---|---|---|---|---|

$\nu_C = 70.1$

EXAMPLE 2

Aperture Ratio = 1:1.4 ~ 1:1.6
Focal Length = 12.9 ~ 73

| | r | d | N | $\nu$ |
|---|---|---|---|---|
| 1 | 139.993 | 2.00 | 1.80518 | 25.4 |
| 2 | 52.200 | 7.98 | 1.62041 | 60.3 |
| 3 | 296.968 | 0.10 | | |
| 4 | 47.400 | 5.34 | 1.71300 | 53.8 |
| 5 | 169.296 | 1.97 | | |
| 6 | 297.300 | 1.20 | 1.67000 | 57.3 |
| 7 | 16.900 | 4.50 | | |
| 8 | −52.445 | 1.20 | 1.77250 | 49.7 |
| 9 | 25.815 | 1.63 | | |
| 10 | 27.625 | 3.12 | 1.84666 | 23.9 |
| 11 | 1141.732 | 31.75 | | |
| 12 | −30.186 | 1.20 | 1.61800 | 63.4 |
| 13 | −199.745 | 9.02 | | |
| 14 | 84.817 | 4.59 | 1.69680 | 55.5 |
| 15 | −49.138 | 0.10 | | |
| 16 | 44.000 | 3.30 | 1.71300 | 53.8 |
| 17 | −800.000 | 0.10 | | |
| 18 | 24.750 | 2.83 | 1.77250 | 49.7 |
| 19 | 54.610 | 3.14 | | |
| 20 | −68.000 | 1.20 | 1.84666 | 23.9 |
| 21 | 56.177 | 0.90 | | |
| 22 | 23.205 | 7.32 | 1.58913 | 61.0 |
| 23 | −174.750 | 0.14 | | |
| 24 | 20.698 | 1.50 | 1.84666 | 23.9 |
| 25 | 10.710 | 9.66 | | |
| 26 | 19.310 | 2.88 | 1.66892 | 45.0 |
| 27 | 260.000 | | | |

Figure 5:
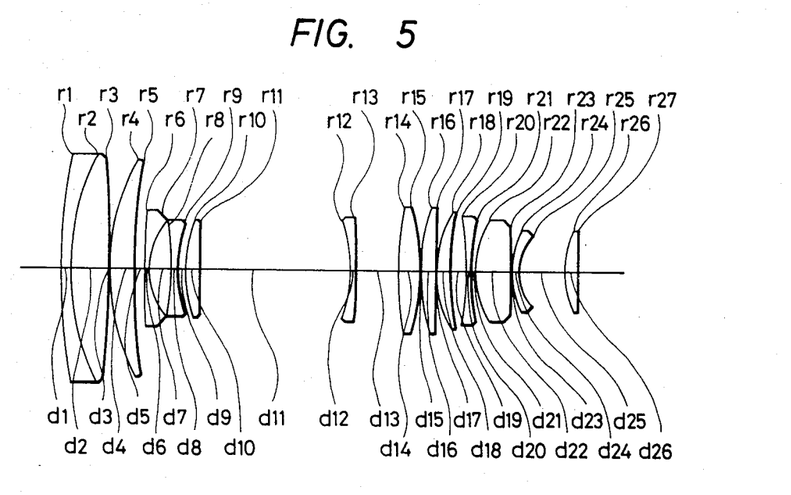
FIG. 5 is a schematic diagram of a lens according to Example 2 of the present invention.
Figure 6:
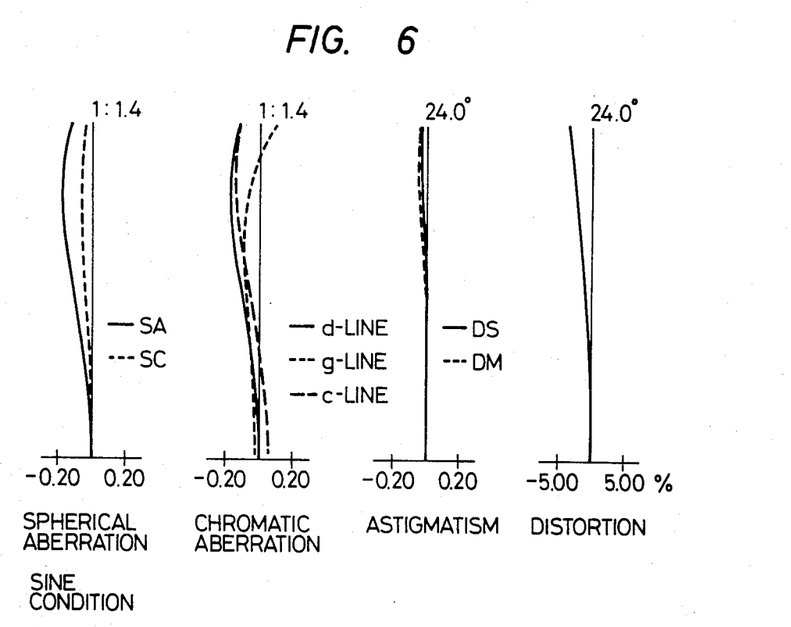
FIGS. 6, 7, 8 are diagrams illustrative of aberrations of the lens according to Example 2 at minimum, medium and maximum focal lengths, respectively.
Figure 7:
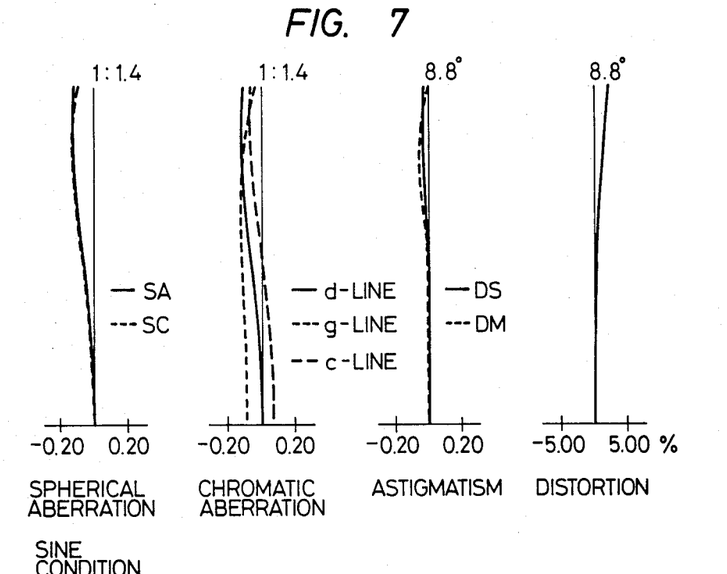
Figure 8:
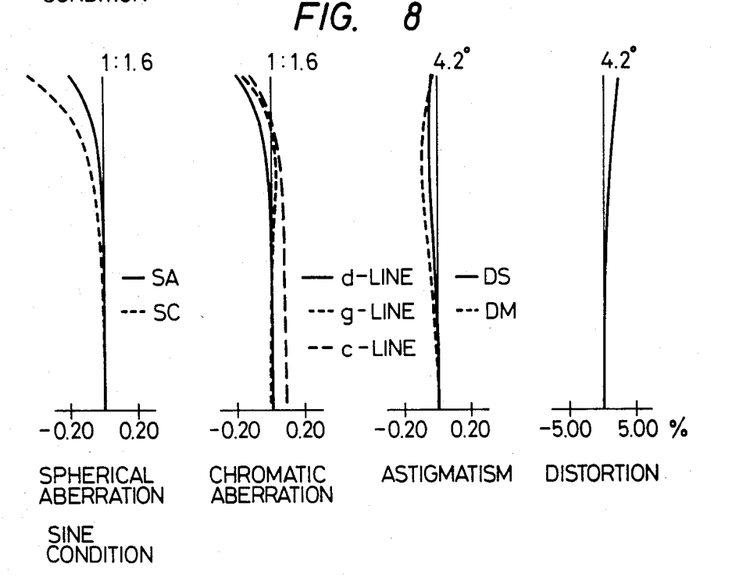

$F_F = 5.15\ F_T$
$|F_V| = 1.56\ F_T$ $$\left|\frac{F_{NA} + F_{NB}}{2}\right| = 1.30\ F_M$$

$$\frac{N_A + N_B}{2} = 1.84666$$

$\nu_C = 63.4$

EXAMPLE 3

Aperture Ratio = 1:1.6
Focal Length = 14.3 ~ 84

| | r | d | N | $\nu$ |
|---|---|---|---|---|
| 1 | 155.860 | 2.00 | 1.80518 | 25.4 |
| 2 | 56.700 | 7.62 | 1.60311 | 60.7 |
| 3 | −387.380 | 0.10 | | |
| 4 | 51.387 | 5.87 | 1.71300 | 53.8 |
| 5 | 212.500 | 0.93 | | |
| 6 | 325.500 | 1.20 | 1.69100 | 54.8 |
| 7 | 18.982 | 4.67 | | |
| 8 | −38.330 | 1.20 | 1.77250 | 49.7 |
| 9 | 28.608 | 1.45 | | |
| 10 | 31.610 | 3.43 | 1.80518 | 25.4 |
| 11 | −271.441 | 41.03 | | |
| 12 | −37.630 | 1.20 | 1.48749 | 70.1 |
| 13 | 472.000 | 1.42 | | |
| 14 | 106.775 | 4.16 | 1.67000 | 57.3 |
| 15 | −36.540 | 5.07 | | |
| 16 | 48.350 | 2.88 | 1.62041 | 60.3 |
| 17 | 2100.000 | 0.10 | | |
| 18 | 19.750 | 5.48 | 1.62041 | 60.3 |
| 19 | 640.000 | 1.76 | | |
| 20 | −109.125 | 1.20 | 1.80518 | 25.4 |

-continued

| | r | d | N | ν |
|---|---|---|---|---|
| 21 | 30.500 | 15.00 | | |
| 22 | 22.199 | 1.60 | 1.80518 | 25.4 |
| 23 | 12.059 | 4.84 | | |
| 24 | 17.608 | 5.06 | 1.71300 | 53.8 |
| 25 | −81.262 | | | |

Figure 9:
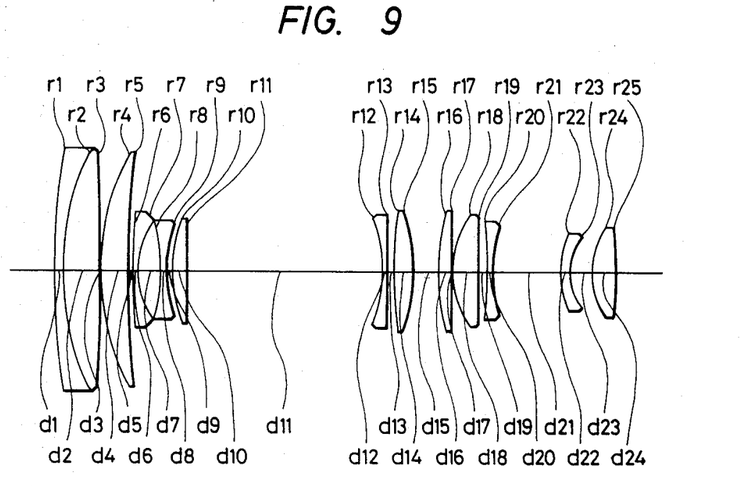
FIG. 9 is a schematic diagram of a lens according to Example 3 of the present invention.
Figure 10:
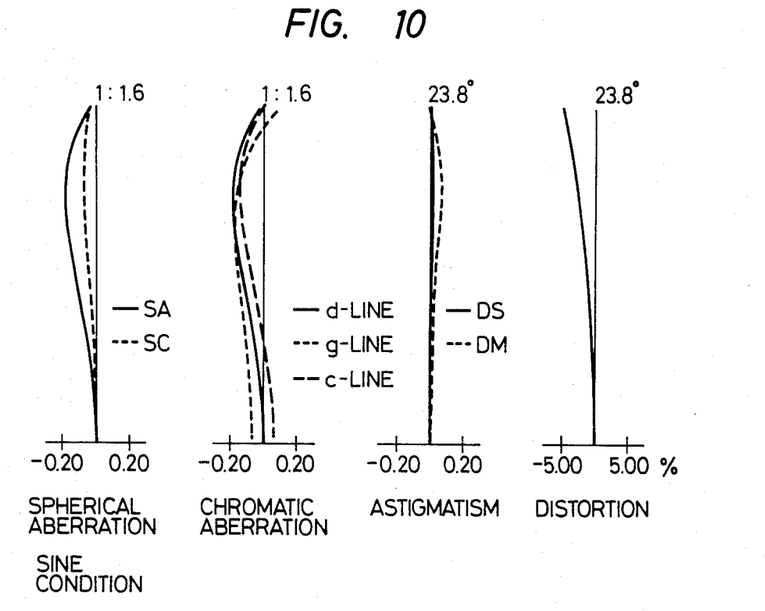
FIGS. 10, 11, 12 are diagrams illustrative of aberrations of the lens according to Example 3 at minimum, medium and maximum focal lengths, respectively.
Figure 11:
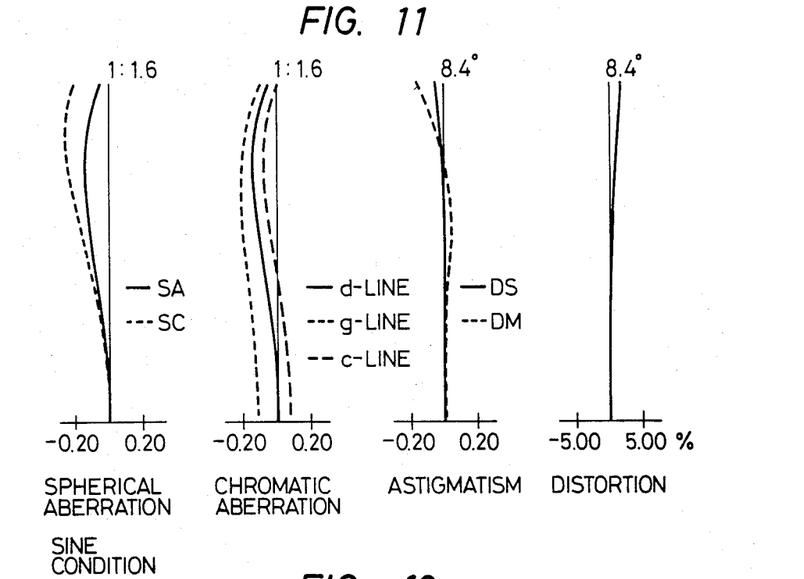
Figure 12:
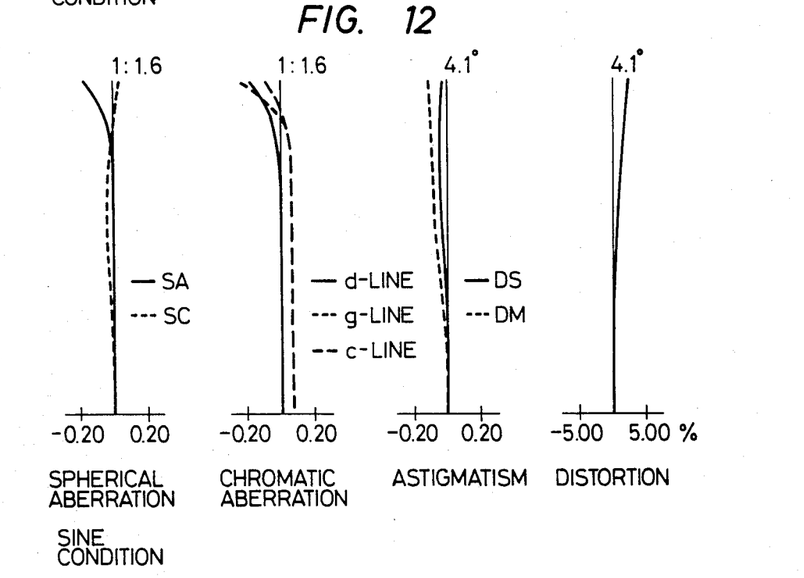

$F_F = 5.09\ F_T$
$|F_V| = 1.35\ F_T$ $$\left|\frac{F_{NA} + F_{NB}}{2}\right| = 0.88\ F_M$$

$$\frac{N_A + N_B}{2} = 1.80518$$

$\nu_C = 70.1$

What is claimed is:

1. A zoom lens comprising a first lens component having a positive refractive power, a second lens component haing a negative refractive power, a third lens component having a negative refractive power, and a fourth lens component having a positive refractive power, the first through fourth lens components being arranged in order from an object, in which said first lens component comprises a focusing lens component of a composite lens having a first negative lens and a second positive lens, and a third positive-meniscus lens, said second lens component comprises a variator lens composed of fourth and fifth negative lenses and a sixth positive lens mainly for varying magnification, said third lens component comprises a compensator lens component composed of a seventh negative lens mainly for compensating for a variation of a focal point due to varied magnification, and said fourth lens component comprises a fixed master lens component composed of four or more positive lenses and two negative lenses with positive lenses disposed most closely to the object and an image, respectively, said bright zoom lens satisfying the following requirements:

$$5.5\ F_T > F_F > 4.8\ F_T \quad (1)$$

$$1.6\ F_T > |F_V| > 1.2\ F_T \quad (2)$$

$$1.4\ F_M > \frac{|F_{NA} + F_{NB}|}{2} > 0.7\ F_M \quad (3)$$

$$\frac{N_A + N_B}{2} > 1.78 \quad (4)$$

$$\nu_C > 50 \quad (5)$$

where
$F_T$: the focal length of the overall lens system when the focal length is minimum;
$F_T$: the focal length of the first lens component;
$F_V$: the focal length of the second lens component;
$F_M$: the focal length of the fourth lens component;
$F_{NA}$, $F_{NB}$: the focal lengths of the two negative lenses in the fourth lens component;
$N_A$, $N_B$: the refractive indices at the d-line of the two negatie lenses in the fourth lens component; and
$\nu_C$: the Abbe number of third lens component or compensator lens component.

2. The zoom lens of claim 1 further satisfying the following chart, where:
r: the radius of curvature of a lens;
d: the thickness of a lens or the distance between lenses;
N: the refractive index of a lens at the d-line; and
ν: the Abbe number of a lens:
Aperture Ratio=1:1.4∼1:1.6
Focal Length=12.9∼73

| | r | d | N | ν |
|---|---|---|---|---|
| 1 | 139.993 | 2.00 | 1.80518 | 25.4 |
| 2 | 52.754 | 7.50 | 1.62041 | 60.3 |
| 3 | −312.400 | 0.10 | | |
| 4 | 47.092 | 5.73 | 1.71300 | 53.8 |
| 5 | 163.954 | 1.96 | | |
| 6 | 320.000 | 1.20 | 1.69680 | 55.5 |
| 7 | 17.239 | 4.48 | | |
| 8 | −52.200 | 1.20 | 1.73400 | 51.5 |
| 9 | 25.200 | 1.82 | | |
| 10 | 27.500 | 2.80 | 1.84666 | 23.9 |
| 11 | 270.359 | 32.92 | | |
| 12 | −30.207 | 1.20 | 1.48749 | 70.1 |
| 13 | −1381.595 | 8.09 | | |
| 14 | 85.349 | 4.19 | 1.62041 | 60.3 |
| 15 | −43.450 | 0.10 | | |
| 16 | 44.030 | 3.59 | 1.73400 | 51.5 |
| 17 | −684.351 | 0.10 | | |
| 18 | 24.854 | 2.80 | 1.77250 | 49.7 |
| 19 | 60.000 | 3.31 | | |
| 20 | −65.500 | 1.20 | 1.84666 | 23.9 |
| 21 | 41.418 | 2.54 | | |
| 22 | 23.270 | 5.18 | 1.55963 | 61.2 |
| 23 | −96.560 | 1.30 | | |
| 24 | 20.983 | 1.50 | 1.84666 | 23.9 |
| 25 | 11.525 | 6.19 | | |
| 26 | 472.000 | 1.49 | 1.68893 | 31.1 |
| 27 | −106.300 | 1.25 | | |
| 28 | 19.696 | 2.18 | 1.58144 | 40.8 |
| 29 | 74.200 | | | |

$F_F = 5.13\ F_T$
$|F_V| = 1.49\ F_T$ $$\left|\frac{F_{NA} + F_{NB}}{2}\right| = 1.28\ F_M$$

$$\frac{N_A + N_B}{2} = 1.84666$$

$\nu_C = 70.1$

3. The zoom lens of claim 1 further satisfying the following chart, where:
r: the radius of curvature of a lens;
d: the thickness of a lens or the distance between lenses;
N: the refractive index of a lens at the d-line; and
ν: the Abbe number of a lens:
Aperture Ratio=1:1.4∼1:1.6
Focal Length=12.9∼73

| | r | d | N | ν |
|---|---|---|---|---|
| 1 | 139.993 | 2.00 | 1.80518 | 25.4 |
| 2 | 52.200 | 7.98 | 1.62041 | 60.3 |
| 3 | 296.968 | 0.10 | | |
| 4 | 47.400 | 5.34 | 1.71300 | 53.8 |
| 5 | 169.296 | 1.97 | | |
| 6 | 297.300 | 1.20 | 1.67000 | 57.3 |
| 7 | 16.900 | 4.50 | | |
| 8 | −52.445 | 1.20 | 1.77250 | 49.7 |
| 9 | 25.815 | 1.63 | | |
| 10 | 27.625 | 3.12 | 1.84666 | 23.9 |
| 11 | 1141.732 | 31.75 | | |
| 12 | −30.186 | 1.20 | 1.61800 | 63.4 |
| 13 | −199.745 | 9.02 | | |
| 14 | 84.817 | 4.59 | 1.69680 | 55.5 |
| 15 | −49.138 | 0.10 | | |
| 16 | 44.000 | 3.30 | 1.71300 | 53.8 |

-continued

| | r | d | N | ν |
|---|---|---|---|---|
| 17 | −800.000 | 0.10 | | |
| 18 | 24.750 | 2.83 | 1.77250 | 49.7 |
| 19 | 54.610 | 3.14 | | |
| 20 | −68.000 | 1.20 | 1.84666 | 23.9 |
| 21 | 56.177 | 0.90 | | |
| 22 | 23.205 | 7.32 | 1.58913 | 61.0 |
| 23 | −174.750 | 0.14 | | |
| 24 | 20.698 | 1.50 | 1.84666 | 23.9 |
| 25 | 10.710 | 9.66 | | |
| 26 | 19.310 | 2.88 | 1.66892 | 45.0 |
| 27 | 260.000 | | | |

$F_F = 5.15\ F_T$
$|F_V| = 1.56\ F_T$ $$\left|\frac{F_{NA} + F_{NB}}{2}\right| = 1.30\ F_M$$

$$\frac{N_A + N_B}{2} = 1.84666$$

$\nu_C = 63.4$

4. The zoom lens of claim 1 further satisfying the following chart, where:
r: the radius of curvature of a lens;
d: the thickness of a lens or the distance between lenses;
N: the refractive index of a lens at the d-line; and
ν: the Abbe number of a lens:
Aperture Ratio=1:1.6
Focal Length=14.3~84

| | r | d | N | ν |
|---|---|---|---|---|
| 1 | 155.860 | 2.00 | 1.80518 | 25.4 |
| 2 | 56.700 | 7.62 | 1.60311 | 60.7 |
| 3 | −387.380 | 0.10 | | |
| 4 | 51.387 | 5.87 | 1.71300 | 53.8 |
| 5 | 212.500 | 0.93 | | |
| 6 | 325.500 | 1.20 | 1.69100 | 54.8 |
| 7 | 18.982 | 4.67 | | |
| 8 | −38.330 | 1.20 | 1.77250 | 49.7 |
| 9 | 28.608 | 1.45 | | |
| 10 | 31.610 | 3.43 | 1.80518 | 25.4 |
| 11 | −271.441 | 41.03 | | |
| 12 | −37.630 | 1.20 | 1.48749 | 70.1 |
| 13 | 472.000 | 1.42 | | |
| 14 | 106.775 | 4.16 | 1.67000 | 57.3 |
| 15 | −36.540 | 5.07 | | |
| 16 | 48.350 | 2.88 | 1.62041 | 60.3 |
| 17 | 2100.000 | 0.10 | | |
| 18 | 19.750 | 5.48 | 1.62041 | 60.3 |
| 19 | 640.000 | 1.76 | | |
| 20 | −109.125 | 1.20 | 1.80518 | 25.4 |
| 21 | 30.500 | 15.00 | | |
| 22 | 22.199 | 1.60 | 1.80518 | 25.4 |
| 23 | 12.059 | 4.84 | | |
| 24 | 17.608 | 5.06 | 1.71300 | 53.8 |
| 25 | −81.262 | | | |

$F_F = 5.09\ F_T$
$|F_V| = 1.35\ F_T$ $$\left|\frac{F_{NA} + F_{NB}}{2}\right| = 0.88\ F_M$$

$$\frac{N_A + N_B}{2} = 1.80518$$

$\nu_C = 70.1$

* * * * *